United States Patent [19]

Birkle et al.

[11] Patent Number: 5,188,718

[45] Date of Patent: Feb. 23, 1993

[54] APPARATUS FOR ELECTROLYTIC SURFACE COATING OF POURABLE MATERIAL

[75] Inventors: Siegfried Birkle, Höchstadt/Aisch; Johann Gehring, Spardorf; Waldemar Nippe, Erlangen, all of Fed. Rep. of Germany

[73] Assignee: Siemens Aktiengesellschaft, Berlin & Munich, Fed. Rep. of Germany

[21] Appl. No.: 752,673

[22] PCT Filed: Feb. 21, 1990

[86] PCT No.: PCT/EP90/00294

§ 371 Date: Nov. 6, 1991

§ 102(e) Date: Nov. 6, 1991

[87] PCT Pub. No.: WO90/10738

PCT Pub. Date: Sep. 20, 1990

[30] Foreign Application Priority Data

Mar. 6, 1989 [EP] European Pat. Off. ........ 89103919.0

[51] Int. Cl.⁵ .............................................. C25D 17/28
[52] U.S. Cl. ................................................... 204/201
[58] Field of Search ....................................... 204/201

[56] References Cited

U.S. PATENT DOCUMENTS

| | | | |
|---|---|---|---|
| 4,670,120 | 6/1987 | Birkle et al. | 204/201 |
| 4,701,248 | 10/1987 | Birkle et al. | 204/201 |
| 4,969,985 | 11/1990 | Birkle | 204/201 |

FOREIGN PATENT DOCUMENTS

1360610 7/1974 United Kingdom .

Primary Examiner—T. M. Tufariello
Attorney, Agent, or Firm—Kenyon & Kenyon

[57] ABSTRACT

The bulk material is transportable in an electrolyte in the conveying trough of a vibrator conveyor. The conveying trough forms a cathodic track for the bulk material. According to the invention, a granulate anode (40) is provided which consists of a granulate of the material provided for deposition, which is transportable with the vibration in an anodic track (44) associated with the cathodic track (22). This form of realization of the apparatus with a large-surface anode of movable granulate results in a simple design solution for supplying and for replacing the anodes and in a better material utilization of the anode. In addition, the necessary down times are reduced.

13 Claims, 3 Drawing Sheets

APPARATUS FOR ELECTROLYTIC SURFACE COATING OF POURABLE MATERIAL

BACKGROUND OF THE INVENTION

The invention relates to an apparatus for electrolytic surface coating of pourable material, preferably for electrodeposition of metal, in particular aluminum, from an electrolyte. The pourable material is transported in the cathodic track of a vibrator conveyor at least partly in the treatment bath of the electrolyte.

It is known that by surface improvement of metal parts their life can be lengthened and new areas of use can be opened up. For example, the coating of light metal and ferrous materials may be appropriate, as they generally involve relatively base metals, the surfaces of which may corrode under atmospheric action. Suitable pretreatment gives the parts a polished surface without cover layer. The metallic coating may be supplemented with an aftertreatment.

During the electrodeposition the pourable small parts must be held together so that each individual part has electric contact. On the other hand, the bulk material to be treated should be spread out to the extent that the metal deposition can occur on a product surface as large as possible and a current density as uniform as possible is ensured on all parts. Another essential prerequisite for satisfactory metal coatings with a uniform layer thickness is sufficient mixing of the material during the electrodeposition. The apparatus for electrolytic surface coating is equipped with conveying means for the transport of the bulk material through the electrolyte, which in conjunction with corresponding inlet and outlet locks permit either continuous or intermittent feeding and removal of the material. In addition, the movement through the electrolyte and the thorough mixing of the material as well as the transport through the electrolyte must be carried out in such a way that gentle treatment of the material is ensured and even delicate parts are not mechanically damaged during the electrodeposition.

For mass electrodeposition, in particular for electrodeposition of aluminum, a known apparatus is suitable in which a vibrator conveyor with a horizontal and a vertical vibration component is provided for the transport of the pourable material through the treatment bath. This vibrator conveyor transports the pourable material, utilizing the forces of gravity, in a spiral conveying trough in ascending direction around a central pipe connected with the conveying trough. The vibrator conveyor is accommodated with the central pipe in a gasproof vessel which contains an electrolyte into which the vibrator conveyor dips partially. As drive means are used for example oblique-action vibrators or obliquely set rods. Such vibrator conveyers require relatively little drive force and make possible a gentle conveyance of the pourable material. One obtains intensive product movement and good electrolyte exchange as well as uniform current consumption over the entire effective surface of the spread-out material (EP-A0 209 015).

In a known apparatus for the plating of parts by immersion and movement in a plating solution, these parts execute a vibrational movement and at the same time a circular movement. The parts are present with the plating solution in a vessel. The movement path of the parts leads from a lower entry zone spirally upward to an exit zone. For moving the parts, the entire vessel containing the plating solution is made to vibrate (FR-A 2 103 611).

Since during the coating the material of the anodes is eroded and deposited on the bulk material, the anodes must, as is known, be replaced after a predetermined number of hours of operation. Further it is desired to obtain a high material utilization of the anodes, and in addition the availability of the installation is to be maintained by reduction of the down times for changing the anodes.

For the electrolytic surface coating of pourable material, in particular for the electrodeposition of aluminum in a vibrator conveyor system, the anodes may be disposed, accessible from the outside, on the inner wall of the vessel or on a so-called anode shaft cover. As the anodes are used up by the coating process, their life is limited to a predetermined number of hours of operation. For this reason they are replaced when about 50 to 70% of their material has been used up. This is necessary because otherwise the anodes may corrode through if the erosion is irregular and the remaining stumps may warp due to their dead weight and may thus establish a shortcircuit to the cathode. For changing the anodes, the installation filled with electrolyte at about 100° C. must be cooled, emptied, flushed with toluene, and dried. The electric leads of the anodes are disconnected, the anodes exchanged through openings in the vessel wall, and for restarting the apparatus these operations occur in reverse order.

SUMMARY OF THE INVENTION

It is the object of the invention to indicate an apparatus for electrolytic surface coating of bulk material with a vibrator conveyor system which is of especially simple design and makes simple changing of the anodes possible. In particular the life of the anode is to be lengthened considerably.

According to the invention, this problem is solved with the characterizing feature of claim 1. In this form of realization of the apparatus for surface coating it is possible, after a predetermined number of hours of operation, to remove residual anode material from the installation in a simple manner and to supply new anode material as a granulate.

The cathode and anode tracks are appropriately secured on joint supporting stringpieces which serve at the same time as power lead for the cathode. These supporting stringpieces are then appropriately connected with the central pipe.

BRIEF DESCRIPTION OF THE DRAWINGS

For further elucidation of the invention reference is made to the drawing, in which an apparatus for electrodeposition of aluminum is illustrated schematically as a practical example.

DETAILED DESCRIPTION OF THE INVENTION

Figure 1:
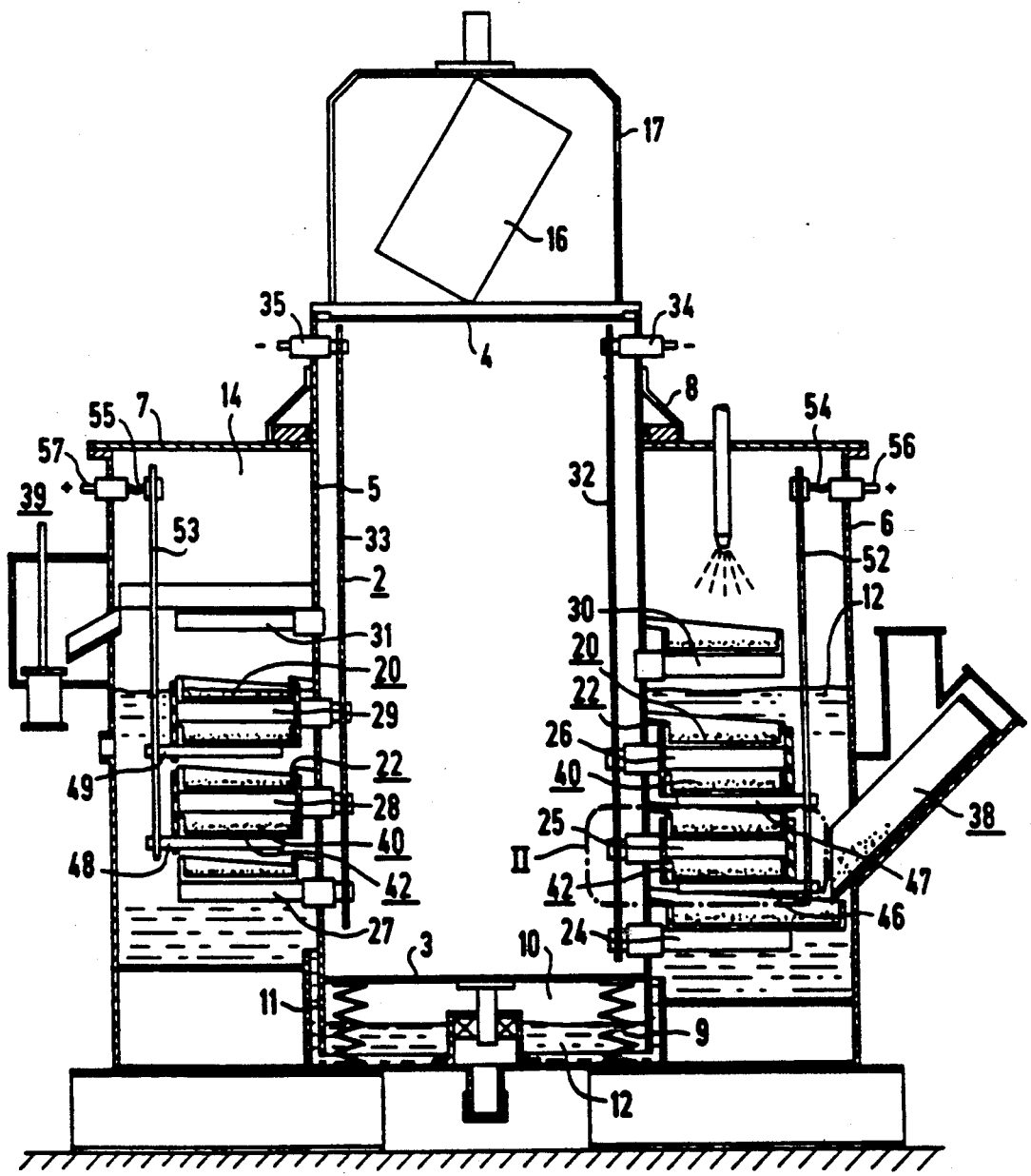
FIG. 1 shows a transverse section through the installation, and in FIG. 2 the design of the electrodes and their electrical contacting is illustrated.

In the apparatus according to FIG. 1 for electrolytic surface coating of pourable material, preferably for the electrodeposition of metal, in particular aluminum, from an aprotic, oxygen- and water-free aluminum-organic electrolyte, a vibrator conveyor is provided for the transport of pourable material to be coated. The vibrator conveyor comprises a central pipe 2 with a bottom 3, a cover 4, and a sidewall 5. The central pipe 2 protrudes from a vessel 6, the cover 7 of which in the form of an annular disk is fastened on the sidewall 5 of the central pipe 2 through a flexible connection 8. The sidewall 5 of the vessel 6 is connected with the bottom. The bottom 3 of the central pipe 2 rests, able to vibrate, on springs 9 and on a gas cushion 10, which is enclosed in the manner of a diving bell between the bottom 3 of the central pipe 2 and an annular-cylindrical extension 11 of the central pipe 2, as well as an electrolyte 12, by which also the central pipe 2 is partially surrounded. Above the electrolyte 12 a gas chamber 14 is formed, which may be filled preferably with nitrogen. The central pipe 2 is provided with an oscillatory drive 16, which is disposed on a bearing block 17 above the cover 4 of the central pipe 2.

In conjunction with a mechanism not shown in the figure, the drive 16 produces an oscillating movement of the central pipe 2 and hence of a conveying trough containing the bulk material 20, which trough forms a cathodic track 22, arranged spirally around the central pipe 2 and connected with it. The conveying trough 21 is provided with supporting stringpieces 24 to 31, disposed at predetermined intervals around the central pipe 2. The supporting stringpieces 24 to 29 serve both as mechanical mount and as power lead for the cathodic track 22 and hence also of the bulk material 20. Two additional supporting stringpieces 30 and 31, present above the electrolyte 12, serve only to fasten the cathodic track 22. Each of the superposed stringpieces 24 to 26 and 27 to 29 is electroconductively connected by means of a contact bar 32, 33 to an electrode terminal 34, 35. For supplying the bulk material there is provided a feed lock 38, and for the removal of the bulk material, a discharge lock 39.

Between the spirals of the conveying trough a granulate anode 40 is provided, which consists of a granulate of the material that is intended for the coating of the bulk material and is transported through the oscillating movement of the central pipe 2 of a perforated anodic track 42 consisting of an electrically insulating material. As power lead for the granulate anode 40 contact pins 46 to 49 are provided. The superposed contact pins 46 and 47 are connected via a contact bar 52 and a flexible connecting conductor 54 to an electrode terminal 56, which is connected to a voltage source not shown in the figure. In like manner the contact pins 48 and 49 are connected via a contact bar 53 and a flexible connecting conductor 55 to an electrode terminal 57, which too is connected to a supply voltage not shown in the figure. In this form of realization of the apparatus, consumed anode material can be replaced continuously by new granulate during the deposition. For this purpose a lock not shown in the figure is provided for supplying the anode material and possibly also for its removal. These locks may be offset 90° for example relative to the locks 38 and 39 for the bulk material 20.

Figure 2:
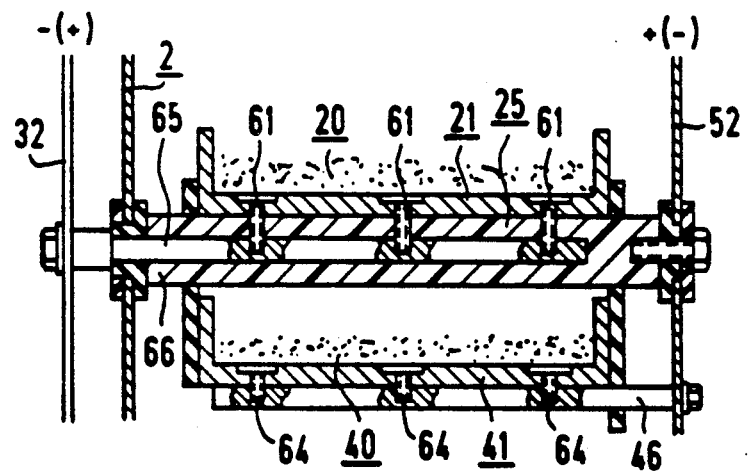

In the form of realization according to FIG. 2, only a part of FIG. 1 with the supporting stringpiece 25 is shown, which is fastened on the central pipe 2 and connected electroconductively with the contact bar 32. The cathode track 21, containing the bulk material 20, is screwed to the supporting stringpiece 21. For this purpose screws 61 are used which consist of electrically conducting material and which may in particular be provided with enlarged heads. These screws, for example six for each of the stringpieces, of which only three are indicated in the figure for simplification, serve both for the mechanical attachment of the cathode track 22 on the stringpiece 25 and for current transmission from the contact bar 32 to the cathode track 22. The stringpiece 25 is electrically insulated against the central pipe 2. The stringpiece 25 comprises a metallic contact pin 65, surrounded by a sheath 66, which may consist of electrically insulating material, preferably laminated cloth. The screws 61 form an electric connection between the bulk material 20 and the contact pin 65, which is electroconductively connected with the contact bar 32. The granulate anode 40 is connected via a screw union with screws 64, which can serve both for the attachment and for the electric contacting of the granulate anode 40, to the electrically insulating contact pin 46, which is connected to the contact bar 52. The electrical and chemical insulation of the contact bar 52 and of the contact pin 46 is not shown in the figure for simplification.

Figure 3:
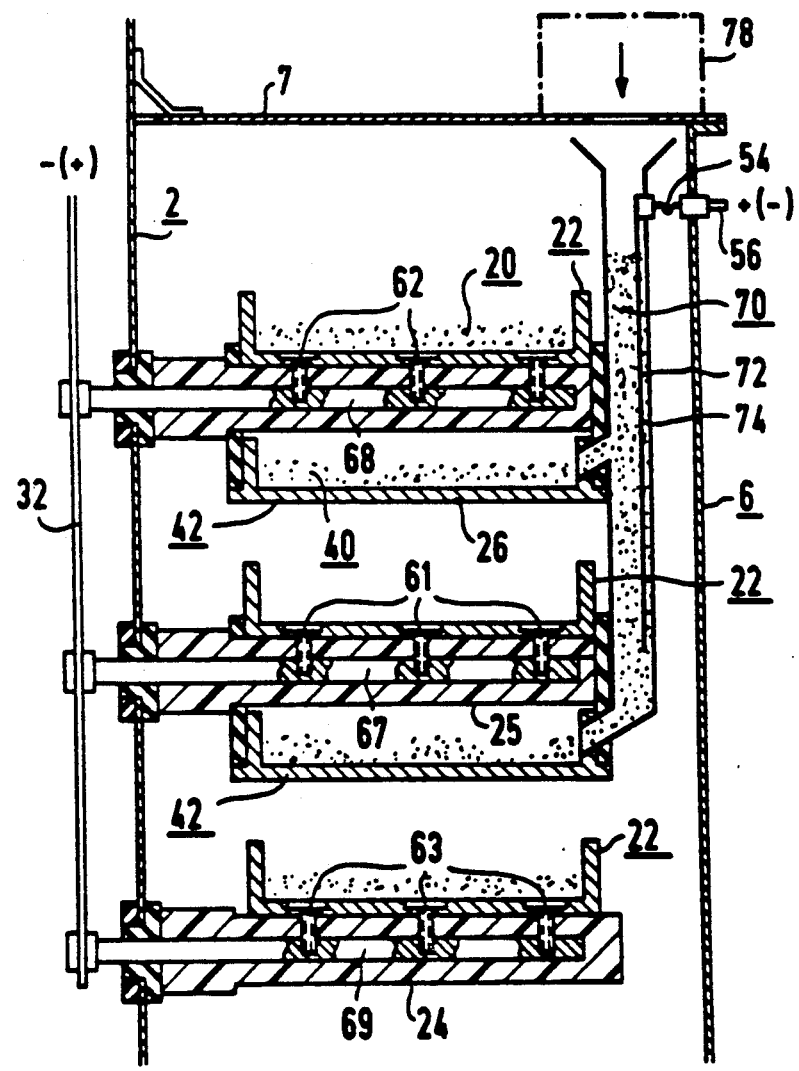
FIG. 3 depicts a further embodiment of the invention wherein the cathodic track is electroconductively connected to the contact bar via screws and contact pins.

In a further form of realization according to FIG. 3, the cathodic track 22 containing the bulk material 20 is electroconductively connected to the contact bar 12 via screws 61 to 63 as well as contact pins 67 to 69. For the anode granulate contained in the anodic track 42, however, a separate power lead 70 is provided, consisting of the anode granulate 40. This power lead 70 consists of an insulated down pipe 72, which is filled with the anode granulatee 40. Protruding into this anode granulate 40 is an electric conductor 74 which is passed through the down pipe 72 and is connected to the anode terminal 56 via the flexible connecting conductor 54. Admission of the granulate 40 to the power lead 70 occurs through an opening, not specifically marked, in the cover 7 of vessel 6. Above the cover 7 a lock 78 is provided, which may be constructed in known manner and is indicated only in dash-dot lines in the figure.

The granulate anode is moved with the vibration of the central pipe 2 in the anode track 42 preferably in a closed loop. For this purpose the anode track may be provided for example with a return device not shown in the drawing, which may consist for example of a valve controllable from the outside, by means of which the anode granulate 40 falls from an upper part of the anode track 42 back onto a lower part. In similar manner also the bulk material 20 can be conducted in a closed loop until a sufficient coating has been obtained.

Figure 4:
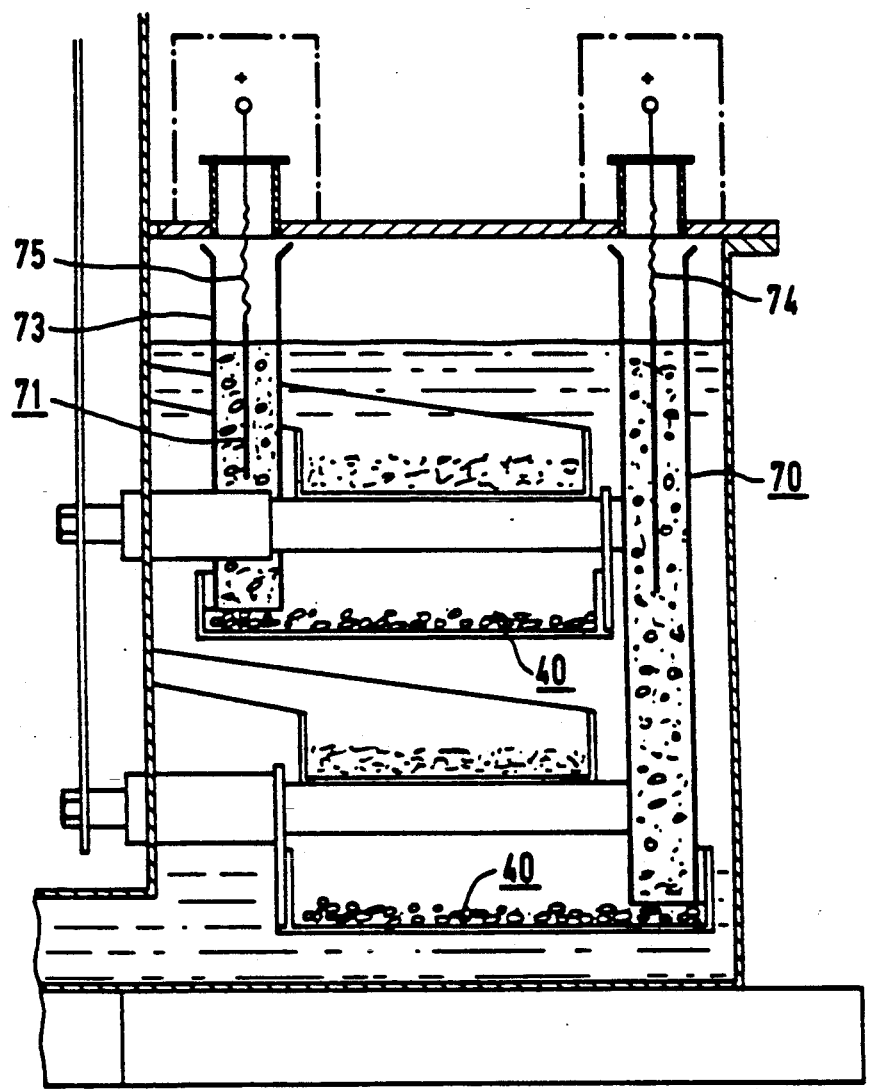
FIG. 4 depicts yet a further embodiment of the invention and illustrates a power lead.

In the form of realization according to FIG. 4, besides the power lead 70 with the down pipe 72 and the conductor 74 there is associated with the anodic column an additional power lead 71. In this poer lead 71, too, an anodic column is formed by the granulate, which column is contacted by a conductor 75 protruding into the anodic column in the upper part of the down pipe 73.

What is claimed is:

1. An apparatus for electrolytic surface coating of a pourable material, comprising: a vibrator conveyor having a conveying trough serving as a cathodic track, the conveying trough being disposed spirally around a central pipe, the central pipe partially dipping into a vessel for holding a source of electrolyte and the central pipe being provided with an oscillatory drive; a granulate anode associated with the conveying trough, the granulate anode comprising a granulate of the material provided for the surface coating, and the granulate anode being movably mounted in a perforated anodic track having about equal curvature to the cathodic track and at least substantially constant distance from the cathodic track.

2. The apparatus according to claim 1 wherein the cathodic track is mounted on supporting stringpieces which are fastened on the central pipe and which functions as an electric power lead.

3. The apparatus according to claim 1 wherein the anodic track is fastened on supporting stringpieces of the cathodic track.

4. The apparatus according to claim 2 wherein the anodic track is fastened on supporting stringpieces of the cathodic track.

5. The apparatus according to claim 1 wherein the granulate anode has a power lead comprising granulate of the material used for the surface coating.

6. The apparatus according to claim 2 wherein the granulate anode has a power lead comprising granulate of the material used for the surface coating.

7. The apparatus according to claim 3 wherein the granulate anode has a power lead comprising granulate of the material used for the surface coating.

8. The apparatus according to claim 5 wherein the granulate anode has a power lead comprising granulate of the material used for the surface coating.

9. The apparatus according to claim 5 wherein the power lead is a down pipe which is at least partially filled with granulate of the material used for the surface coating, the apparatus further comprising an electric connecting conductor which protrudes into the granulate in said down pipe and which is connected to an anode terminal.

10. The apparatus according to claim 6 wherein the lead is a down pipe which is at least partially filled with granulate of the material used for the surface coating, the apparatus further comprising an electric connecting conductor which protrudes into the granulate in said down pipe and which is connected to an anode terminal.

11. The apparatus according to claim 7 wherein the lead is a down pipe which is at least partially filled with granulate of the material used for the surface coating, the apparatus further comprising an electric connecting conductor which protrudes into the granulate in said down pipe and which is connected to an anode terminal.

12. The apparatus according to claim 5 further comprising a second power lead comprising granulate of the material used for the surface coating.

13. The apparatus according to claim 9 further comprising a second power lead comprising granulate of the material used for the surface coating.

* * * * *